US010227234B2

(12) United States Patent
Mays et al.

(10) Patent No.: US 10,227,234 B2
(45) Date of Patent: Mar. 12, 2019

(54) HYDROGEN PRODUCTION VIA SORBENT ENHANCED REFORMING WITH ATMOSPHERIC CALCINATION

(71) Applicant: Gas Technology Institute, Des Plaines, IL (US)

(72) Inventors: Jeffrey Mays, Woodland Hills, CA (US); Sreenivasan Ravishankar, Vancouver, WA (US)

(73) Assignee: GAS TECHNOLOGY INSTITUTE, Des Plaines, IL (US)

( * ) Notice: Subject to any disclaimer, the term of this patent is extended or adjusted under 35 U.S.C. 154(b) by 14 days.

(21) Appl. No.: 15/165,521

(22) Filed: May 26, 2016

(65) Prior Publication Data
US 2016/0347611 A1 Dec. 1, 2016

Related U.S. Application Data

(60) Provisional application No. 62/167,871, filed on May 28, 2015.

(51) Int. Cl.
*C01B 3/30* (2006.01)
*B01D 53/04* (2006.01)
(Continued)

(52) U.S. Cl.
CPC .............. *C01B 3/24* (2013.01); *B01D 53/04* (2013.01); *B01D 53/047* (2013.01); *C01B 3/30* (2013.01);
(Continued)

(58) Field of Classification Search
CPC ..... C01B 3/24; C01B 2203/0475; C01B 3/30; C01B 3/56; C01B 2203/1241; C01B 3/34;
(Continued)

(56) References Cited

U.S. PATENT DOCUMENTS 7,931,712 B2 * 4/2011 Zubrin .................... C01B 3/384
423/644
2004/0261617 A1 12/2004 Stewart
(Continued)

FOREIGN PATENT DOCUMENTS

WO  WO 2008/039783 A2   4/2008
WO  WO-2011060556 A1 *  5/2011 ........... B01D 53/047

OTHER PUBLICATIONS

Ana L. Garcia-Lario et al., "Performance of a combined CaO-based sorbent and catalyst on H2 production, via sorption enhanced methane steam reforming," Chemical Engineering Journal 264 (2015) 697-705, (9 pages).

*Primary Examiner* — Amber R Orlando
*Assistant Examiner* — Syed T Iqbal
(74) *Attorney, Agent, or Firm* — Pauley Erickson & Kottis

(57) ABSTRACT

Processes and systems for producing hydrogen gas utilizing a sorbent enhanced reformer in combination with a calciner operating at atmospheric pressure. Feed material is introduced into the sorbent enhanced reformer to produce carbon dioxide and hydrogen gas. Sorbent material within the reformer acts to absorb carbon dioxide and form a used sorbent. The used sorbent is introduced into the atmospheric calciner to heat the used sorbent to desorb carbon dioxide from the used sorbent to produce regenerated sorbent which can be recycled to the reformer.

21 Claims, 4 Drawing Sheets

(51) Int. Cl.
*C01B 3/24* (2006.01)
*B01D 53/047* (2006.01)
*C01B 3/34* (2006.01)
*C01B 3/56* (2006.01)

(52) U.S. Cl.
CPC .................. *C01B 3/34* (2013.01); *C01B 3/56* (2013.01); *B01D 2253/10* (2013.01); *B01D 2256/16* (2013.01); *B01D 2257/504* (2013.01); *B01D 2259/40088* (2013.01); *C01B 2203/0233* (2013.01); *C01B 2203/043* (2013.01); *C01B 2203/0425* (2013.01); *C01B 2203/0475* (2013.01); *C01B 2203/1241* (2013.01)

(58) Field of Classification Search
CPC .... C01B 2203/0425; C01B 2203/0233; C01B 2203/043; B01D 2256/16; B01D 53/04; B01D 2259/40088; B01D 53/047; B01D 2253/10; B01D 2257/504
See application file for complete search history.

(56) References Cited

U.S. PATENT DOCUMENTS

| | | |
|---|---|---|
| 2005/0232855 A1 | 10/2005 | Stevens et al. |
| 2008/0145309 A1 | 6/2008 | Bavarian et al. |
| 2008/0227626 A1 | 9/2008 | Essaki et al. |
| 2009/0263316 A1* | 10/2009 | Iyer .......................... C01B 3/38 423/658.3 |

* cited by examiner

HYDROGEN PRODUCTION VIA SORBENT ENHANCED REFORMING WITH ATMOSPHERIC CALCINATION

CROSS REFERENCE TO RELATED APPLICATION

This application claims the benefit of U.S. Provisional Application 62/167,871, filed 28 May 2015, the disclosure of which is incorporated by reference herein and made a part hereof, including but not limited to those portions which specifically appear hereinafter.

BACKGROUND OF THE INVENTION

Field of the Invention

This invention relates generally to hydrogen production and, more particularly, to hydrogen production via sorbent enhanced reforming with atmospheric calcination.

Discussion of Related Art

Sorbent Enhanced Reforming (SER) is an emerging processing technology for hydrogen production with integrated $CO_2$ capture.

Such processing typically employs Le Chatelier's principle to assist in producing high purity hydrogen. Essentially, such processing utilizes a sorbent material to adsorb carbon dioxide produced during the reforming reaction, causing the reaction to produce more carbon dioxide which is subsequently removed. The removal of the carbon dioxide preferentially shifts the thermodynamic equilibrium to a high purity hydrogen equilibrium.

A secondary benefit of SER processing is that nearly all of the carbon dioxide is retained by or in the sorbent material. To desirably enable re-use of the sorbent material, the captured carbon dioxide must subsequently be liberated from the sorbent material. The regeneration of the sorbent material is typically performed in a component known as a calciner.

There are two typical types of calcination processing: direct and indirect firing. Direct firing calcination utilizes hot gas, such as from combustion or an electrical heating processes, and mixes such hot gas directly with the sorbent material. Such direct firing calcination processing typically simplifies the solids handling approach, and reduces the calcination temperature that is required by decreasing the partial pressure of the carbon dioxide. Indirect firing calcination utilizes heat such as provided from an outside source which physically separated from the sorbent material. Such indirect firing calcination processing typically complicates the heat transfer process and increases the required calcination temperature, but provides a nearly pure carbon dioxide stream such as may be found useful for carbon capture and sequestration or co-production needs.

In the past, the calcination processing has commonly been performed at a pressure within 5% of the reactor system pressure which typically ranges from 30-363 psia.

SUMMARY OF THE INVENTION

A general object of the subject development is to provide or result in improved hydrogen production.

In accordance with one embodiment, the general object of the subject development can be attained, at least in part, through a process for producing hydrogen gas that involves introducing feed material into a sorbent enhanced reformer to produce carbon dioxide and hydrogen gas. The sorbent enhanced reformer desirably contains a quantity of a sorbent material to absorb carbon dioxide and form a used sorbent. The process further involves introducing the used sorbent into a calciner operating at atmospheric pressure to heat the used sorbent to desorb carbon dioxide from the used sorbent to produce regenerated sorbent. At least a portion of the regenerated sorbent can be desirably recycled to the sorbent enhanced reformer such as to be employed in further processing.

In accordance with another embodiment, the subject development provides a process for producing hydrogen gas that involves introducing feed material including natural gas and $H_2O$ into a sorbent enhanced reformer operating at a pressure of at least 35 psia to produce carbon dioxide and hydrogen gas. The sorbent enhanced reformer desirably contains a quantity of a $CO_2$ sorbent material to absorb carbon dioxide and form a used sorbent. Sorbent enhanced reformer products gases including hydrogen gas are separated from the used sorbent. The used sorbent is introduced into a direct firing calciner operating at atmospheric pressure to heat the used sorbent to desorb carbon dioxide from the used sorbent to produce regenerated sorbent. If desired, at least a portion of separated sorbent enhanced reformer product hydrogen gas can be subsequently purified such as via pressure swing adsorption. Further, at least a portion of the regenerated sorbent is recycled to the sorbent enhanced reformer.

In accordance with another aspect of the invention, a system for producing hydrogen gas is provided. Such a system may contain or include a sorbent enhanced reformer such as containing a quantity of a sorbent material, wherein a feed material produces carbon dioxide and hydrogen gas and the sorbent material absorbs carbon dioxide and forms a used sorbent. The system may further include a separator for separating the used sorbent from sorbent enhanced reformer products gases. A calciner operating at atmospheric pressure is provided or included to heat the used sorbent to desorb carbon dioxide from the used sorbent to produce regenerated sorbent. The system further includes a recycle line to introduce at least a portion of the regenerated sorbent from the calciner to the sorbent enhanced reformer.

The removal of the carbon dioxide via the sorbent serves to advantageously preferentially shift the equilibrium to a high purity hydrogen equilibrium.

Further, nearly all of the carbon dioxide is retained in the sorbent material. The development's use of an atmospheric calciner which operates at local ambient pressures advantageously serves to disengage the calciner from the operating pressure of the reactor.

Those skilled in the art and guided by the teachings herein provided will appreciate that the calciner can desirably be operated with a partial pressure of $CO_2$ at atmospheric pressure (e.g., up to 25%, 20%, or 10% above or below atmospheric pressure) or a partial pressure of $CO_2$ below atmospheric pressure with the introduction of steam or other diluent. Inputs to the calciner may include fuel, air, and a higher pressure sorbent from the SER hydrogen generator. The calcination process causes the sorbent to be raised to a higher pressure. Off-gas from the calcination process may be captured and/or further processed.

As used herein, references to an "atmospheric" calciner, a calciner operating at "atmospheric pressure" or the like are to be understood to refer to calciners and operation at atmospheric pressure ±25%, at atmospheric pressure ±20%, or at atmospheric pressure ±10%.

DETAILED DESCRIPTION OF THE INVENTION

Figure 1:
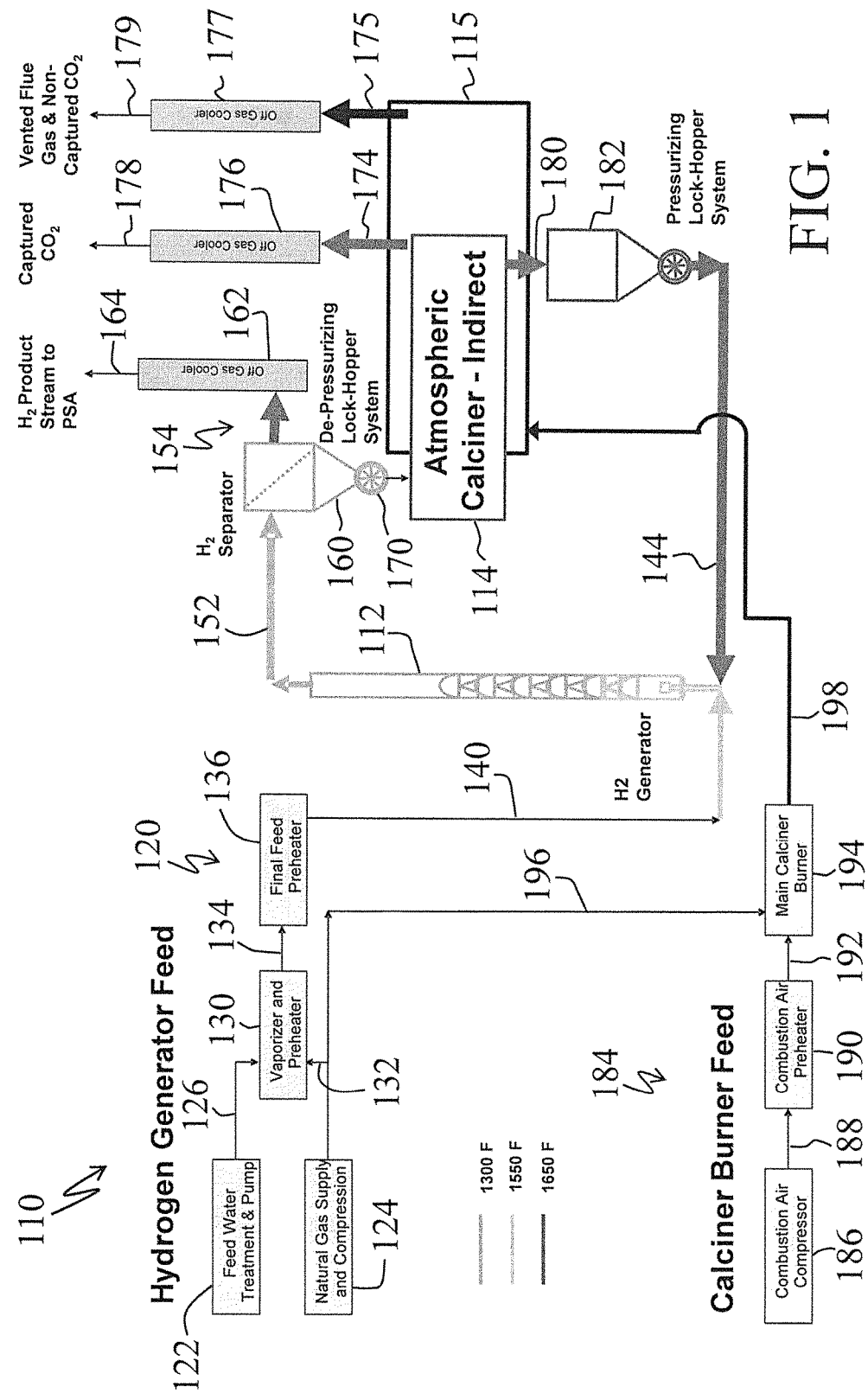
FIG. 1 is a simplified schematic drawing showing a processing system for the production of hydrogen gas in accordance with one aspect of the subject development.

FIG. 1 shows a processing system, generally designated by the reference numeral 110, for the production or generation of hydrogen gas in accordance with one embodiment of the subject development and which processing system 110 employs or utilizes a sorbent enhanced reformer 112 to produce used sorbent, hydrogen gas, and residual gases. As detailed further below, the processing system 110 also employs or utilizes indirect firing calcination and thus includes an indirect firing calciner 114, such as to appropriately process and regenerate used sorbent.

Suitable inputs to the SER hydrogen generator may include a suitable hydrocarbon fuel (e.g., natural gas), steam, a pressurized sorbent such as desirably at least in part from the calciner and may include an off-gas such as from a system associated pressure swing absorber.

The processing system 110 includes a feed material processing section generally designated as 120 for appropriately processing the feed prior to entry into the sorbent enhanced reformer 112 for hydrogen generation or production.

The feed material processing section 120 may, as shown, contain or include a feed water treatment and pump section 122 and a natural gas supply and compression section 124, with feed water being introduced via a line 126 into a vaporizer and preheater unit 130 and at least a portion of the natural gas being introduced into the vaporizer and preheater unit 130 via a line 132. Feed material from the vaporizer and preheater unit 130 is conveyed via a line 134 to a final feed preheater 136, with the resulting heated feed introduced via a line 140 to the hydrogen gas ($H_2$) sorbent enhanced reformer hydrogen generator 112.

Suitable sorbent material is introduced to the hydrogen gas ($H_2$) sorbent enhanced reformer hydrogen generator 112 via a line 144.

Desirable continuous SER processing can make the use of fluidized bed reactor technology desirable for continuous operation. The utilization of fluidized bed reactors can result or produce numerous associated benefits including, for example, increased or improved temperature homogeneity and/or heat transfer.

The SER hydrogen generator 112 utilizes the sorbent material to adsorb carbon dioxide produced during the reforming reaction, causing the reforming reaction to produce additional hydrogen gas and carbon dioxide, with carbon dioxide preferably being removed via the sorbent material. Thus, the removal of the carbon dioxide preferentially shifts the equilibrium to a high purity hydrogen equilibrium.

Taking CaO as the adsorbent material, the primary reactions involved in the sorbent enhanced reforming operation are reactions 1-3 below:

| | | |
|---|---|---|
| $CH_4(g) + H_2O(g) \rightarrow 3H_2(g) + CO(g)$ | Reforming | (1) |
| $CO(g) + H_2O(g) \rightarrow H_2(g) + CO_2(g)$ | Water-Gas Shift | (2) |
| $CaO + CO_2(g) \rightarrow CaCO_3 + Heat$ | Sorbent Carbonization | (3) |
| $CH_4(g) + 2H_2O(g) + CaO \rightarrow 4H_2(g) + CaCO_3$ | Overall SER | (4) |
| $CaCO_3 + Heat \rightarrow CaO + CO_2$ | Sorbent Calcination | (5) |

The overall SER operation is defined in reaction (4) above, with the calcination operation shown in reaction (5).

A product stream 152 exiting from the hydrogen gas ($H_2$) sorbent enhanced reformer hydrogen generator 112 is introduced into an appropriate separator or processing device 154 to separate the solid used sorbent from gaseous product materials. Suitable separator or processing devices in particular embodiments can include filters, cyclones or the like or combinations thereof.

An off-gas stream 160 from the separator 154 is passed to an off-gas cooler 162 for appropriate temperature reduction. Appropriately cooled off-gas, primarily composed of hydrogen gas, is passed via a line 164 for subsequent processing such as further purification such as via a pressure swing absorber, for example.

Solid used sorbent from the separator 154 can be collected in a hopper 166 such as with a valve (not shown) on the solid inlet and a valve 170 on the solid outlet. Once the hopper is appropriately filled, the inlet to the hopper can be closed and the pressure can be vented from the hopper such as via a suitable vent port (not shown). Once the pressure is sufficiently reduced, the sorbent outlet valve 170 is opened to permit discharge of the used sorbent into the atmospheric indirect firing calciner 114.

The calciner 114 serves to desorb the carbon dioxide from the sorbent, which is now regenerated. The carbon dioxide and any other gases pass via a line 174 to a cooler 176 and via a subsequent line 178 such as to a vent stack or other suitable disposal or discharge.

Regenerated sorbent from the calciner 114 is collected via a line 180 in a separate hopper 182 and can be appropriately re-pressurized to a pressure slightly above the reactor pressure. Once the desired pressure is achieved, the regenerated sorbent is metered such as via the line 144 to the SER reactor 112.

The processing system 110 includes a calciner burner feed section generally designated 184 and such as including a combustion air compressor unit 186 which feeds combustion air via a line 188 to a combustion air preheater unit 190 which feeds preheated air via a line 192 to a main calciner burner unit 194. The main calciner burner unit 194 also receives natural gas via a line 196, such as from the natural gas supply and compression section 124, with the combustion products introduced into indirect burner duct 115 which transfers heat into the calciner 114 but is physically separated from the internals of the calciner 114. The residual combustion gases are collected and passed via a line 175 and sent to a heat recovery system 177 where residual heat is extracted from the combustion gases and vented to the atmosphere 179.

As will be appreciated by those skilled in the art and guided by the teachings herein provided, such indirect firing calcination processing provides a nearly pure carbon dioxide stream such as may be found useful for carbon capture and sequestration or co-production needs. As a result, in certain preferred embodiments, the utilization of indirect firing calcination will be preferred.

The use of an atmospheric calciner, such as herein described, can desirably reduce system capital cost such as by eliminating the need for either or both air and PSA off-gas compressors. Additionally, the power required for the operation of such compressors is eliminated which leads to reduced operation cost and increased system efficiency. Further, as in the subject calcination, the calcination temperature is a direct result of carbon dioxide partial pressure, by reducing the pressure, the temperature is desirably also reduced, thus practice in accordance with the subject development can desirably increase the length of life of the sorbent and extend the time period before the sorbent must be replaced.

Figure 2:
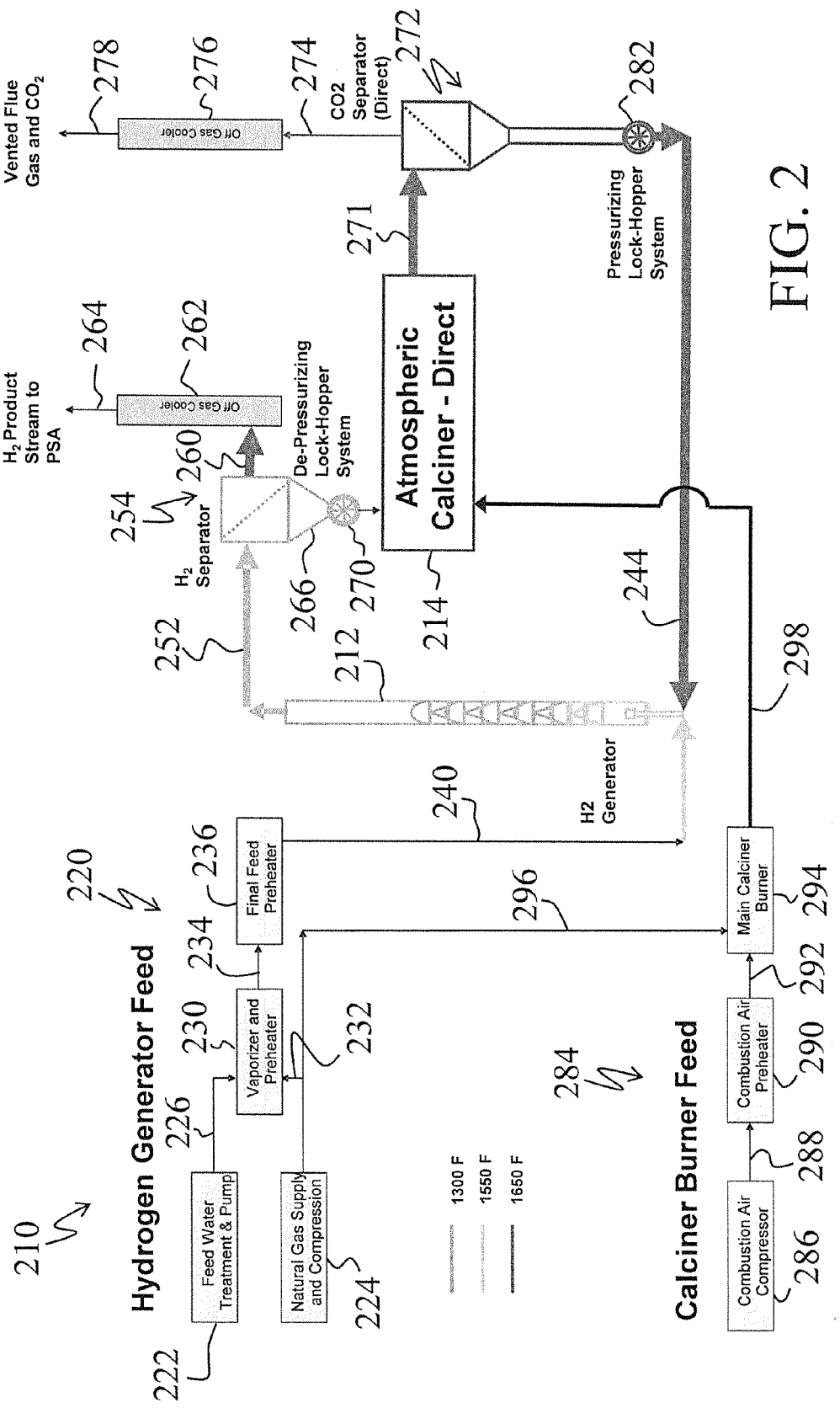
FIG. 2 is a simplified schematic drawing showing an alternative processing system for the production of hydrogen gas in accordance with another embodiment of the subject development.

While processing in accordance with the subject development has been described above making specific reference to a processing system that utilized an indirect firing calciner, the broader practice of the invention is not necessarily so limited as, for example, if desired, the development can be suitably practice utilizing a direct firing calciner. To that end, reference is no made to FIG. 2 which depicts a processing system, generally designated by the reference numeral 210, for the production or generation of hydrogen gas in accordance with another embodiment of the subject development. The processing system 210 is generally similar to the processing system 110 described above except rather than indirect firing calcination and an indirect calciner, the processing system 210 employs or utilizes direct firing calcination and thus includes a direct firing calciner 214 to appropriately process and regenerate used sorbent.

Similar to the processing system 110, the processing system 210 includes a feed material processing section generally designated as 220 for appropriately processing the feed prior to entry into the sorbent enhanced reformer 212 for hydrogen generation or production. The feed material processing section 220 may, as shown, contain or include a feed water treatment and pump section 222 and a natural gas supply and compression section 224, with feed water being introduced via a line 226 into a vaporizer and preheater unit 230 and at least a portion of the natural gas being introduced into the vaporizer and preheater unit 230 via a line 232. Feed material from the vaporizer and preheater unit 230 is conveyed via a line 234 to a final feed preheater 236, with the resulting heated feed introduced via a line 240 to the hydrogen gas ($H_2$) sorbent enhanced reformer hydrogen generator 212.

Suitable sorbent material is introduced to the hydrogen gas ($H_2$) sorbent enhanced reformer hydrogen generator 212 via a line 244.

As with the SER hydrogen generator 112 in the system 110, the SER hydrogen generator 212 utilizes the sorbent material to adsorb carbon dioxide produced during the reforming reaction, causing the reforming reaction to produce additional hydrogen gas and carbon dioxide, with carbon dioxide preferably being removed via the sorbent material. Thus, the removal of the carbon dioxide preferentially shifts the equilibrium to a high purity hydrogen equilibrium.

A product stream 252 exiting from the hydrogen gas ($H_2$) sorbent enhanced reformer hydrogen generator 212 is introduced into an appropriate separator or processing device 254 to separate the solid used sorbent from gaseous product materials. Suitable separator or processing devices in particular embodiments can include filters, cyclones or the like or combinations thereof.

An off-gas stream 260 from the separator 254 is passed to an off-gas cooler 262 for appropriate temperature reduction. Appropriately cooled off-gas, primarily composed of hydrogen gas, is passed via a line 264 for subsequent processing such as further purification such as via a pressure swing absorber, for example.

Solid used sorbent from the separator 254 can be collected in a hopper 266 such as with a valve (not shown) on the solid inlet and a valve 270 on the solid outlet. Once the hopper is appropriately filled, the inlet to the hopper can be closed and the pressure can be vented from the hopper such as via a suitable vent port (not shown). Once the pressure is sufficiently reduced, the sorbent outlet valve 270 is opened to permit discharge of the used sorbent into the atmospheric direct firing calciner 214.

The calciner 214 serves to desorb the carbon dioxide from the sorbent, which is now regenerated. The materials from the direct calciner 214 are passed via a line 271 into an appropriate separator or processing device 272 to separate the regenerated sorbent solid from gases materials, including desorbed carbon dioxide. Suitable separator or processing devices in particular embodiments can include filters, cyclones or the like or combinations thereof.

Carbon dioxide and any other gases pass via a line 274 to a cooler 276 and via a subsequent line 278 such as to a vent stack or other suitable disposal or discharge.

Regenerated sorbent from the separator 272 discharges into a pressurizing lock hopper system 282 which increases the pressure of the regenerated sorbent to SER reactor pressure. The pressurized regenerated sorbent is passed via the line 244 to the SER reactor 212.

The processing system 210, similar to the processing system 110 described above, includes a calciner burner feed section generally designated 284 and such as including a combustion air compressor unit 286 which feeds combustion air via a line 288 to a combustion air preheater unit 290 which feeds preheated air via a line 292 to a main calciner burner unit 294. The main calciner burner unit 294 also receives natural gas via a line 296, such as from the natural gas supply and compression section 224, with the combustion products introduced into the calciner 212 via a line 298.

As will be appreciated by those skilled in the art and guided by the teachings herein provided, whereas indirect firing calcination processing typically complicates the heat transfer process and increases the required calcination temperature, direct firing calcination processing can desirably simplify the solids handling approach, and reduce the calcination temperature that is required by decreasing the partial pressure of the carbon dioxide. As a result, in certain preferred embodiments, the utilization of direct firing calcination will be preferred.

To permit a better appreciation and understanding of the subject development reference will now be made to FIGS. 3 and 4.

Figure 3:
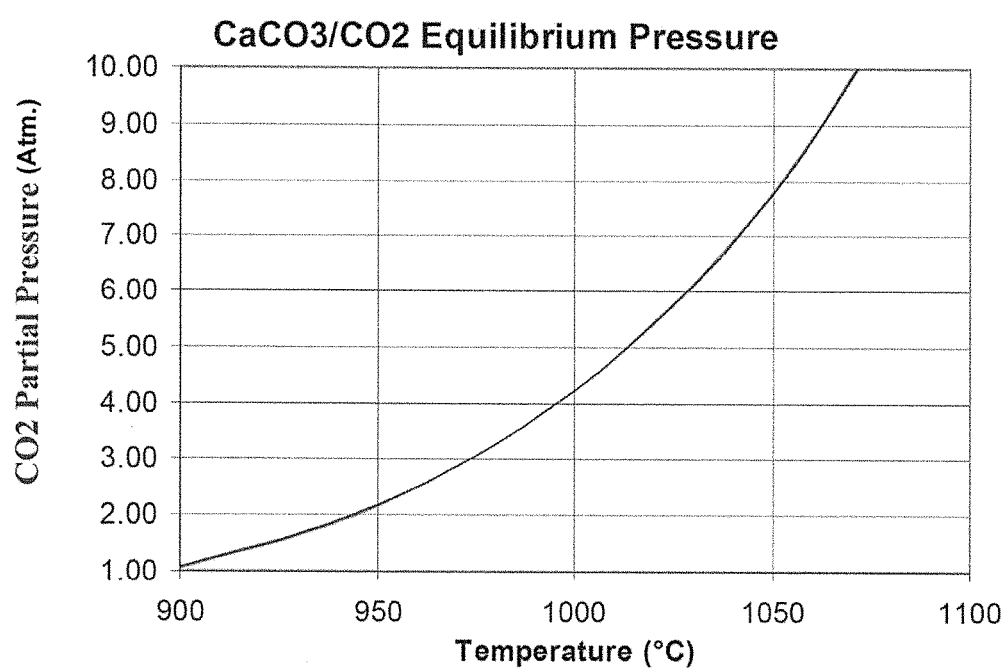
FIG. 3 is a graphical presentation of the mathematical relationship between $CO_2$ partial pressure and temperature for the equilibrium relationship between $CaCO_3$ and $CaO$.

More particularly, FIG. 3 graphically depicts the equilibrium relationship between pressure and calcination temperature for the calcination of $CaCO_3$, reaction (5) shown above. During the calcination of $CaCO_3$, $CO_2$ is generated as a byproduct. The partial pressure of $CO_2$, the byproduct of calcination of $CaCO_3$, is represented as a function of temperature. FIG. 3 demonstrates that as the partial pressure of $CO_2$ increases, the temperature required for calcination increases. The presence of the $CO_2$ influences the driving force of the reaction. Taking this into account, a non-limiting embodiment may desirably employ controls to adjust the temperature as the $CO_2$ partial pressure changes. The $CO_2$ partial pressure and the exit temperature may be monitored and compared to the solid particle input, fuel feed rate and calcining chamber inlet temperature to determine the efficiency of the calcination process. In the event the measured values deviate from the curve, the fuel input may be adjusted to change the temperature.

The heat required for calcination may cause sintering of the solid sorbent particles which reduces surface area and pore volume. This may result in decreased reactivity and adversely affect the ability of the compound to be used in subsequent processes or be recycled for additional byproduct absorption. For example, calcium oxide (CaO) is an absorbent for carbon dioxide ($CO_2$). The absorption reaction creates calcium carbonate ($CaCO_3$). The $CaCO_3$ can thus be calcined back to CaO, but the resulting CaO may undesirably be sintered. The loss of pore volume and surface area reduces the ability of the newly calcined CaO to be reused in a reaction to absorb further $CO_2$.

The amount of sintering may be reduced through limitation of the amount of heat applied to the solid sorbent particles and the time the solid sorbent particles are exposed to the elevated temperatures. Conventional techniques for calcining typically expose the compound being calcined to high temperatures for times of one or more hours. Such durations cause a significant reduction in reactivity of the calcined product. If the calcined product is to be cycled through another reaction (for example to absorb additional $CO_2$) the sintering caused by these other calcining techniques significantly limits and reduced the capability of the calcined product to absorb additional byproduct and/or significantly reduces the number of times the calcined product can be cycled through a process for absorbing byproduct.

Figure 4:
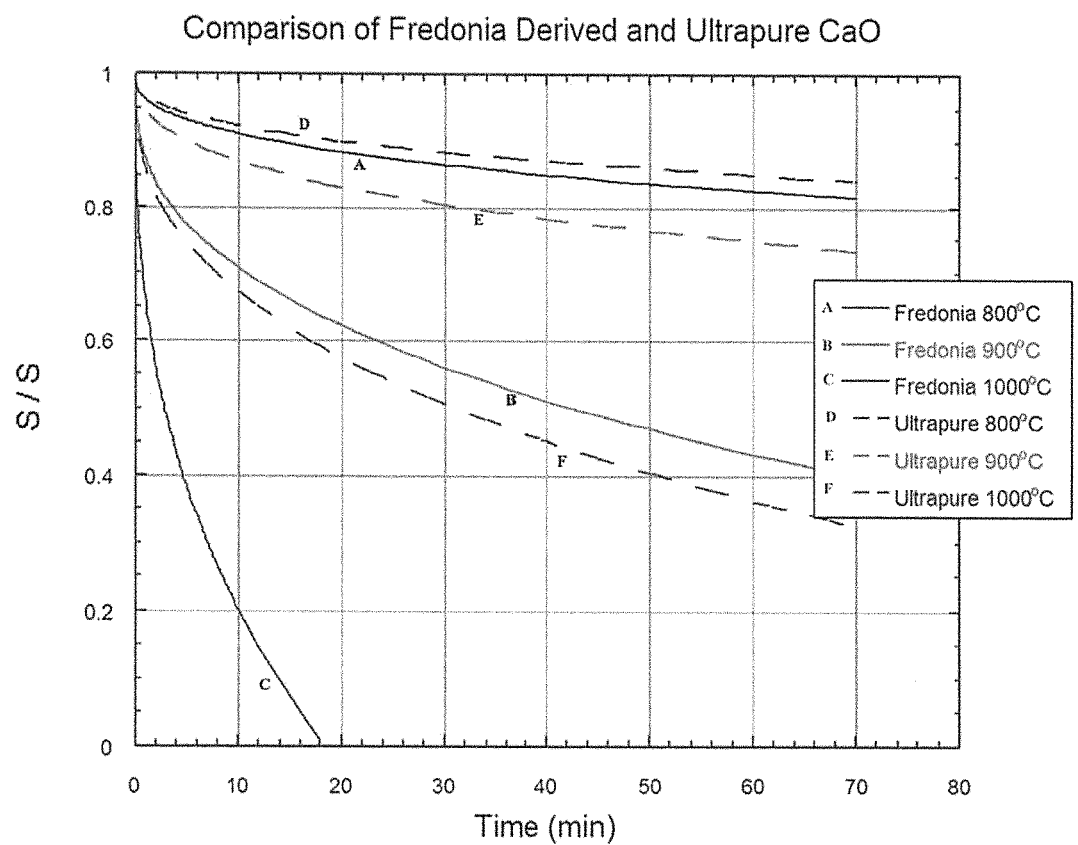
FIG. 4 is a graphical presentation regarding the sintering of Fredonia Derived and Ultrapure CaO at different selected temperatures.

Reference is now made to FIG. 4 graphically depicts the sintering of Fredonia Derived and Ultrapure CaO at different selected temperatures and signifies that an increase in sintering rate will occur at higher temperatures. This will reduce the life of the sorbent (e.g., CaO). As will be appreciated by those skilled in the art and guided by the teachings herein provided, the use of an atmospheric calciner in accordance with the subject development can desirably alleviate or minimize this problem.

Thus, it is to be understood and appreciated that operation in accordance with the subject development can significantly reduce sorbent sintering and enhance solids separation in the calciner.

The claims are not intended to include, and should not be interpreted to include, means-plus- or step-plus-function limitations, unless such a limitation is explicitly recited in a given claim using the phrase(s) "means for" or "step for," respectively.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A process for producing hydrogen gas, the process comprising:
    introducing feed material into a sorbent enhanced reformer to produce carbon dioxide and product hydrogen gas, the sorbent enhanced reformer operating at a pressure of at least 35 psia and containing a quantity of a sorbent material to absorb carbon dioxide and form a used sorbent;
    conveying the product hydrogen gas and the used sorbent from the sorbent enhanced reformer to a separator and separating the product hydrogen gas from the used sorbent to recover the product hydrogen gas;
    introducing the used sorbent into a calciner operating at atmospheric pressure to heat the used sorbent to desorb carbon dioxide from the used sorbent to produce regenerated sorbent; and
    recycling at least a pressurized portion of the regenerated sorbent to the sorbent enhanced reformer.

2. The process of claim 1 additionally comprising:
    recovering at least a portion of the hydrogen gas from the sorbent enhanced reformer.

3. The process of claim 2 additionally comprising:
    forwarding the recovered hydrogen gas for further hydrogen purification processing.

4. The process of claim 3 wherein the further hydrogen purification processing comprises pressure swing adsorption.

5. The process of claim 1 wherein the feed material comprises a hydrocarbon fuel and $H_2O$.

6. The process of claim 5 wherein the hydrocarbon fuel comprises natural gas.

7. The process of claim 1 wherein prior to said introducing of the used sorbent into the calciner, said process additionally comprises separating the used sorbent from sorbent enhanced reformer product gases.

8. The process of claim 7 wherein the separated sorbent enhanced reformer product gases comprise hydrogen gas and said process further comprises purifying at least a portion of said separated sorbent enhanced reformer product hydrogen gas.

9. The process of claim 1 additionally comprising pressurizing at least a portion of the regenerated sorbent prior to said recycling.

10. The process of claim 1 wherein the heating of the used sorbent in the calciner comprises application of direct heat.

11. The process of claim 1 wherein the heating of the used sorbent in the calciner comprises application of indirect heat.

12. The process of claim 1 additionally comprising recovering at least a portion of the desorbed carbon dioxide from the calciner.

13. A process for producing hydrogen gas, the process comprising:
    introducing feed material comprising natural gas and $H_2O$ into a sorbent enhanced reformer operating at a pressure of at least 35 psia to produce carbon dioxide and hydrogen gas, the sorbent enhanced reformer containing a quantity of a $CO_2$ sorbent material absorb carbon dioxide and form a used sorbent;
    separating sorbent enhanced reformer products gases comprising hydrogen gas from the used sorbent;
    introducing the used sorbent into a direct firing calciner operating at atmospheric pressure to heat the used sorbent to desorb carbon dioxide from the used sorbent to produce regenerated sorbent;
    monitoring carbon dioxide partial pressure and exit temperature of the calciner;

increasing the temperature of the calciner as the carbon dioxide partial pressure increases; and recycling at least a pressurized portion of the regenerated sorbent to the sorbent enhanced reformer.

14. The process of claim 13 additionally comprising pressuring at least a portion of the regenerated sorbent prior to said recycling.

15. The process of claim 13 additionally comprising recovering at least a portion of the desorbed carbon dioxide from the calciner.

16. The process of claim 13 wherein said step of separating sorbent enhanced reformer products gases from the used sorbent comprises:

introducing sorbent enhanced reformer products and used sorbent from the sorbent enhanced reformer into a separator in communication with the sorbent enhanced reformer;

separating sorbent enhanced reformer product hydrogen gas from the used sorbent in the separator to recover the product hydrogen gas; and conveying used sorbent separated from the product hydrogen gas from the separator to the direct firing calciner.

17. A system for producing hydrogen gas, the system comprising:

a sorbent enhanced reformer, the sorbent enhanced reformer containing a quantity of a sorbent material and operating at a pressure of at least 35 psia, wherein a feed material produces carbon dioxide and hydrogen gas and the sorbent material absorbs carbon dioxide and forms a used sorbent;

a separator in communication with the sorbent enhanced reformer for accepting product gases and used sorbent from the sorbent enhanced reformer, the separator for separating the used sorbent from the sorbent enhanced reformer products gases;

a calciner operating at atmospheric pressure to heat the used sorbent received from the separator to desorb carbon dioxide from the used sorbent to produce regenerated sorbent; and a recycle line to introduce at least a pressurized portion of the regenerated sorbent from the calciner to the sorbent enhanced reformer.

18. The system of claim 17 wherein the calciner is a direct heating calciner.

19. The system of claim 17 wherein the sorbent enhanced reformer produces the carbon dioxide and the hydrogen gas and the sorbent material absorbs carbon dioxide and fowls a used sorbent at a pressure of at least 35 psia.

20. The system of claim 17 further comprising a carbon dioxide process line to convey at least a portion of the desorbed carbon dioxide from the calciner for further processing.

21. A process for producing hydrogen gas, the process comprising:

introducing feed material comprising natural gas and $H_2O$ into a sorbent enhanced reformer to reform methane and to produce carbon dioxide and product hydrogen gas, the sorbent enhanced reformer operating at a pressure of at least 35 psia and containing a quantity of a sorbent material to absorb carbon dioxide and form a used sorbent, the sorbent enhanced reformer forming a product stream comprising product hydrogen gas and used sorbent;

conveying the product stream to a separator to separate the product hydrogen gas from the used sorbent;

recovering product hydrogen gas from the separator;

conveying the used sorbent from the separator to a calciner operating at atmospheric pressure to heat the used sorbent to desorb carbon dioxide from the used sorbent to produce regenerated sorbent; and recycling at least a portion of the regenerated sorbent to the sorbent enhanced reformer.

* * * * *